(12) United States Patent
Ruan

(10) Patent No.: US 8,057,050 B2
(45) Date of Patent: Nov. 15, 2011

(54) HEIGHT ADJUSTMENT APPARATUS FOR PROJECTION DEVICE

(75) Inventor: Zhuo-Guang Ruan, Guangdong (CN)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 533 days.

(21) Appl. No.: 12/251,426

(22) Filed: Oct. 14, 2008

(65) Prior Publication Data

US 2010/0002203 A1 Jan. 7, 2010

(30) Foreign Application Priority Data

Jul. 3, 2008 (CN) .......................... 2008 1 0302523

(51) Int. Cl.
*G03B 21/00* (2006.01)
*G03B 21/14* (2006.01)
(52) U.S. Cl. ........................................................ 353/70
(58) Field of Classification Search .............. 353/69–70, 353/119, 122; 248/188.1–188.4, 188.8, 188; 348/789
See application file for complete search history.

(56) References Cited

U.S. PATENT DOCUMENTS

| | | | |
|---|---|---|---|
| 6,481,855 B2 * | 11/2002 | Oehler | 353/70 |
| 6,715,890 B2 * | 4/2004 | Huang et al. | 353/119 |
| 6,796,538 B2 * | 9/2004 | Hsu et al. | 248/188.2 |
| 6,871,826 B2 * | 3/2005 | Oyama et al. | 248/188.8 |
| 6,923,417 B2 * | 8/2005 | Chang | 248/649 |
| 7,234,676 B2 * | 6/2007 | Chen et al. | 248/677 |
| 7,409,271 B2 * | 8/2008 | Lee et al. | 701/1 |
| 7,901,091 B2 * | 3/2011 | Chen et al. | 353/119 |
| 2005/0078283 A1 * | 4/2005 | Lee et al. | 353/119 |
| 2006/0113440 A1 * | 6/2006 | Chung et al. | 248/188.2 |
| 2006/0202095 A1 * | 9/2006 | Shao et al. | 248/188.2 |
| 2006/0244932 A1 * | 11/2006 | Hsu et al. | 353/119 |

FOREIGN PATENT DOCUMENTS

| | | |
|---|---|---|
| CN | 1797182 A | 7/2006 |
| JP | 11271879 A | 10/1999 |

* cited by examiner

*Primary Examiner* — Tony Ko
*Assistant Examiner* — Jori S Reilly-Diakun
(74) *Attorney, Agent, or Firm* — Altis Law Group, Inc.

(57) ABSTRACT

A height adjustment apparatus for a projection device comprises a socket, an engaging member, and a lifting member. The projection device comprises a housing having a front and bottom plate perpendicular to each other, the bottom and front plate defining a first and second opening therein, respectively. The socket comprising a locating portion is located on an inner surface of the bottom plate, covers the first opening and defines a third opening therein. The engaging member comprises a main portion, an engaging portion and a deformable portion. The main portion is inserted through the second opening. The engaging portion connecting the main portion defines a fourth opening aligning with the third opening. The deformable portion has a movable portion located in the locating portion. The lifting member comprises an upright lifting portion passing through the third opening and having a toothed face engaged by the engaging portion.

19 Claims, 6 Drawing Sheets

HEIGHT ADJUSTMENT APPARATUS FOR PROJECTION DEVICE

BACKGROUND

1. Technical Field

The disclosure relates to projection devices, and, particularly, to a height adjustment apparatus for a projection device.

2. Description of the Related Art

In general, projectors may require height adjustment for proper display. One form of adjustment in use is a hanging fixture suspending the projector from the ceiling. This fixture is inconvenient for height adjustment. In another common solution, projectors are placed on a table and are accordingly height-adjusted by way of one or more threaded posts adjustably extending downward from the underside of the projector. This is also an inconvenient operation.

Therefore, it is desirable to provide a height adjustment apparatus for a projection device which can provide a convenient way of adjusting the height of a projector or other applicable devices.

DETAILED DESCRIPTION OF EMBODIMENTS

Figure 1:
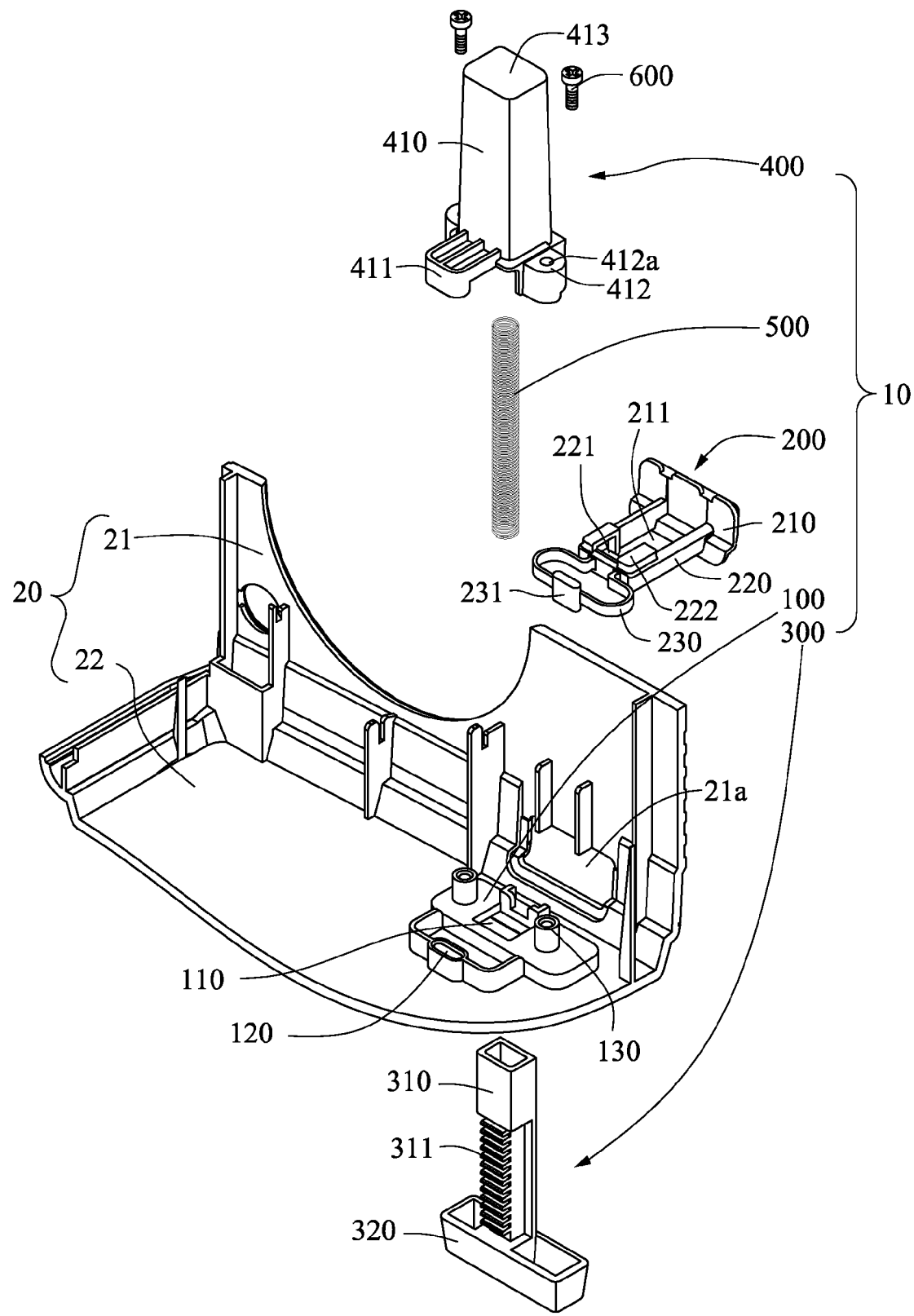
FIG. 1 is an isometric, exploded view of a height adjustment apparatus including a lifting member, an engaging member, and a sleeve, for use in a projection device, according to a first embodiment.

Embodiments of a height adjustment apparatus are described in detail here with reference to the drawings.

Referring to FIGS. 1~4, a height adjustment apparatus 10 is assembled in a projection device housing 20. The projection device housing 20 includes a front plate 21 and a bottom plate 22 substantially perpendicular to the front plate 21. The bottom plate 22 defines a first opening (not shown) therein and the front plate 21 defines a second opening 21a therein. The height adjustment apparatus 10 includes a socket 100, an engaging member 200, a lifting member 300 and a sleeve 400.

The socket 100 is located on an inner surface of the bottom plate 22 and covers the first opening (not shown). The socket 100 defines a third opening 110 therein and includes a locating portion 120 and two opposite screw-receiving portions 130 across the periphery of the third opening 110. In this embodiment, the third opening 110 is quadrangular. The locating portion 120 has a receiving hole (not labeled), is located between the screw-receiving portions 130 and aligned corresponding to the second opening 21a. The socket 100 also includes two screw-receiving portions 130.

Figure 2:
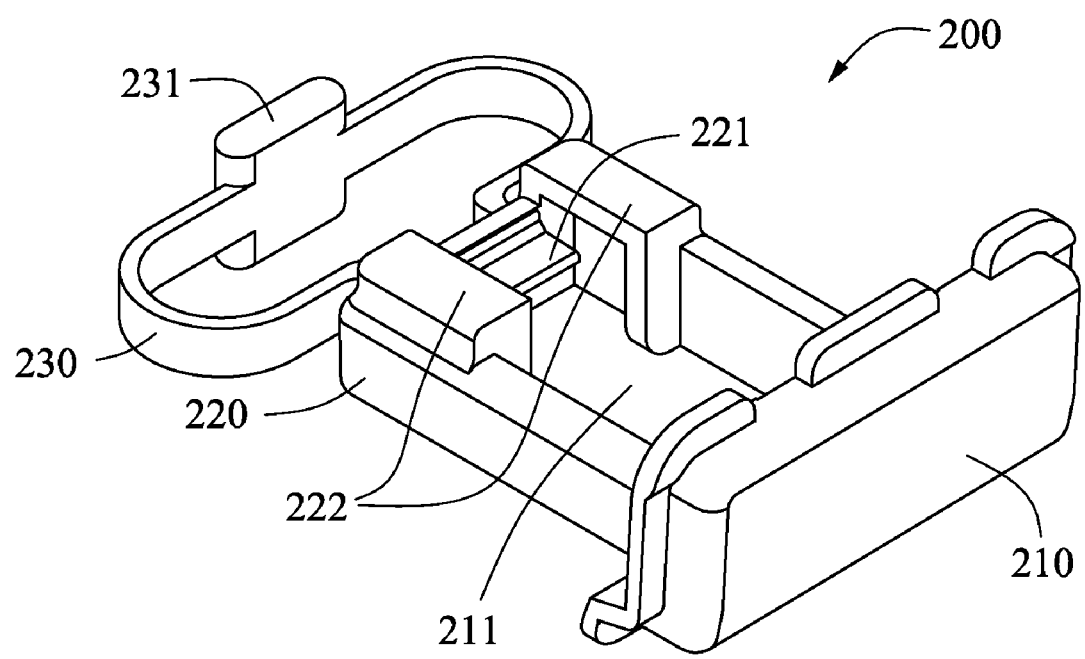
FIG. 2 is an isometric, enlarged view of the engaging member of FIG. 1.

Referring to FIG. 2, the engaging member 200 includes a main portion 210, an engaging portion 220, a deformable portion 230, and a movable portion 231. The main portion 210 defines a fourth opening 211 therein and passes through the second opening 21a such that the fourth opening 211 aligns with the third opening 110. Accordingly, the main portion 210 is fitted into the second opening 21a. In this embodiment, the fourth opening 211 is quadrangular and substantially the same size as the third opening 110. The engaging portion 220 is formed on the outer periphery of the fourth opening 211. Moreover, the engaging portion 220 includes a first blocking portion 221 therein and two second blocking portions 222 protruding therefrom. The first blocking portion 221 is located between the second blocking portions 222 and adjacent to the deformable portion 230. The deformable portion 230 connects the main portion 210 with the movable portion 231 via the engaging portion 220. In this embodiment, the deformable portion 230 is a flexible frame. The movable portion 231 is opposite to the first blocking portion 221 and can be retained by the receiving hole in the locating portion 120. In this embodiment, the movable portion 231 is rectangular and is receivable in the locating portion 120.

Figure 3:
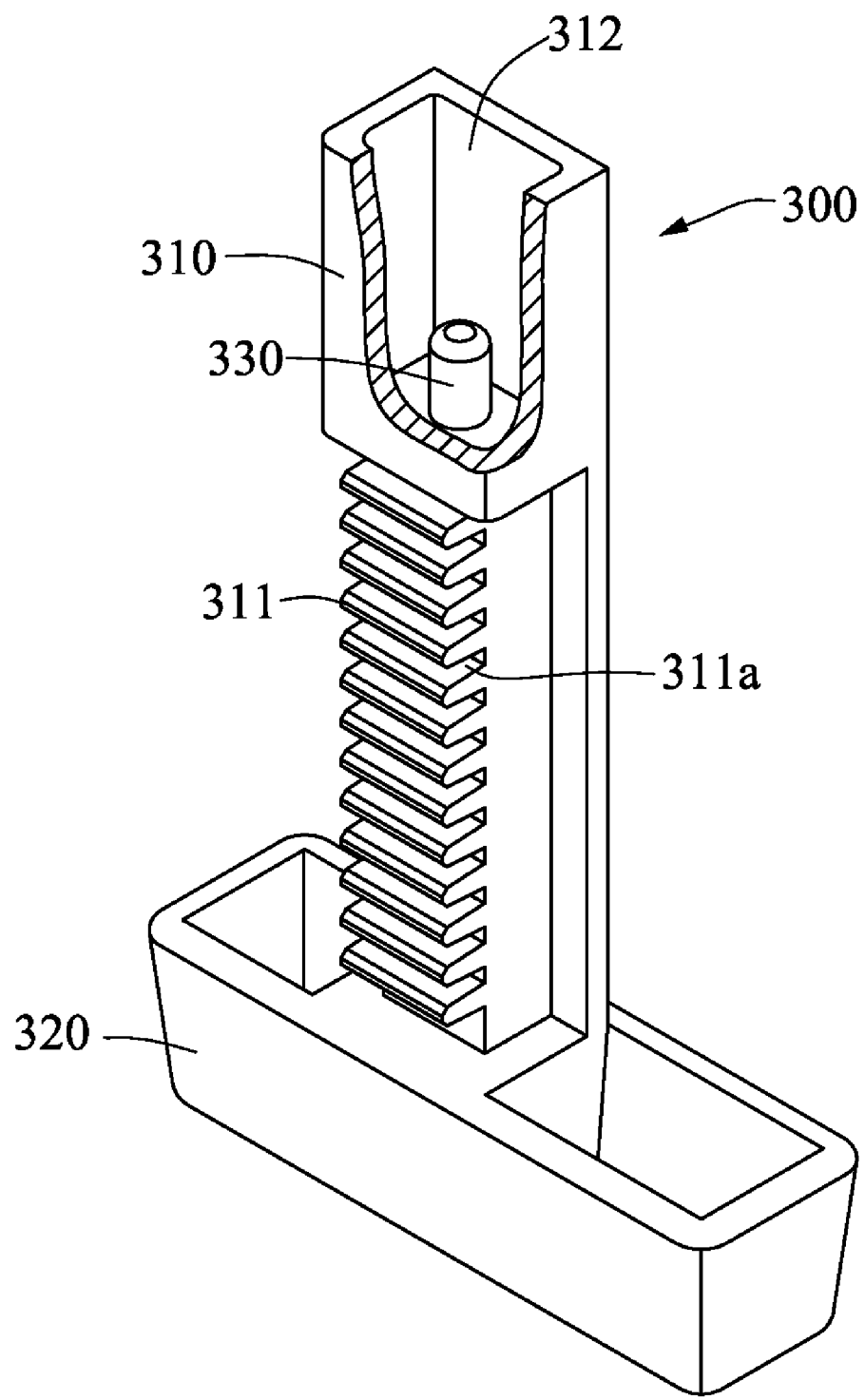
FIG. 3 is an isometric, enlarged, partial cross-section view of the lifting member of FIG. 1.

Referring to FIG. 3, the lifting member 300 includes an upright lifting portion 310. The upright lifting portion 310, including a toothed face 311, is configured to pass through the third opening 110. The toothed face 311 includes notches 311a for engaging the engaging portion 220. In this embodiment, the notches 311a are the same size. The upright lifting portion 310 is receivable in the third opening 110. When the engaging member 200 abuts the locating portion 120, the deformable portion 230 deforms and allows the lifting member 300 to elevate or lower projection device housing 20. Moreover, the lifting member 300 also includes a receiving portion 312 including a first protruding member 330. In this embodiment, the lifting member 300 is T-shaped. The T-shaped lifting member 300 also includes a base 320 supporting the upright lifting portion 310. The base 320 perpendicular to the upright lifting portion 310 is shorter than the upright lifting portion 310 passing through the third opening 110 to elevate or lower projection device housing 20, but not limited by other embodiments.

Figure 4:
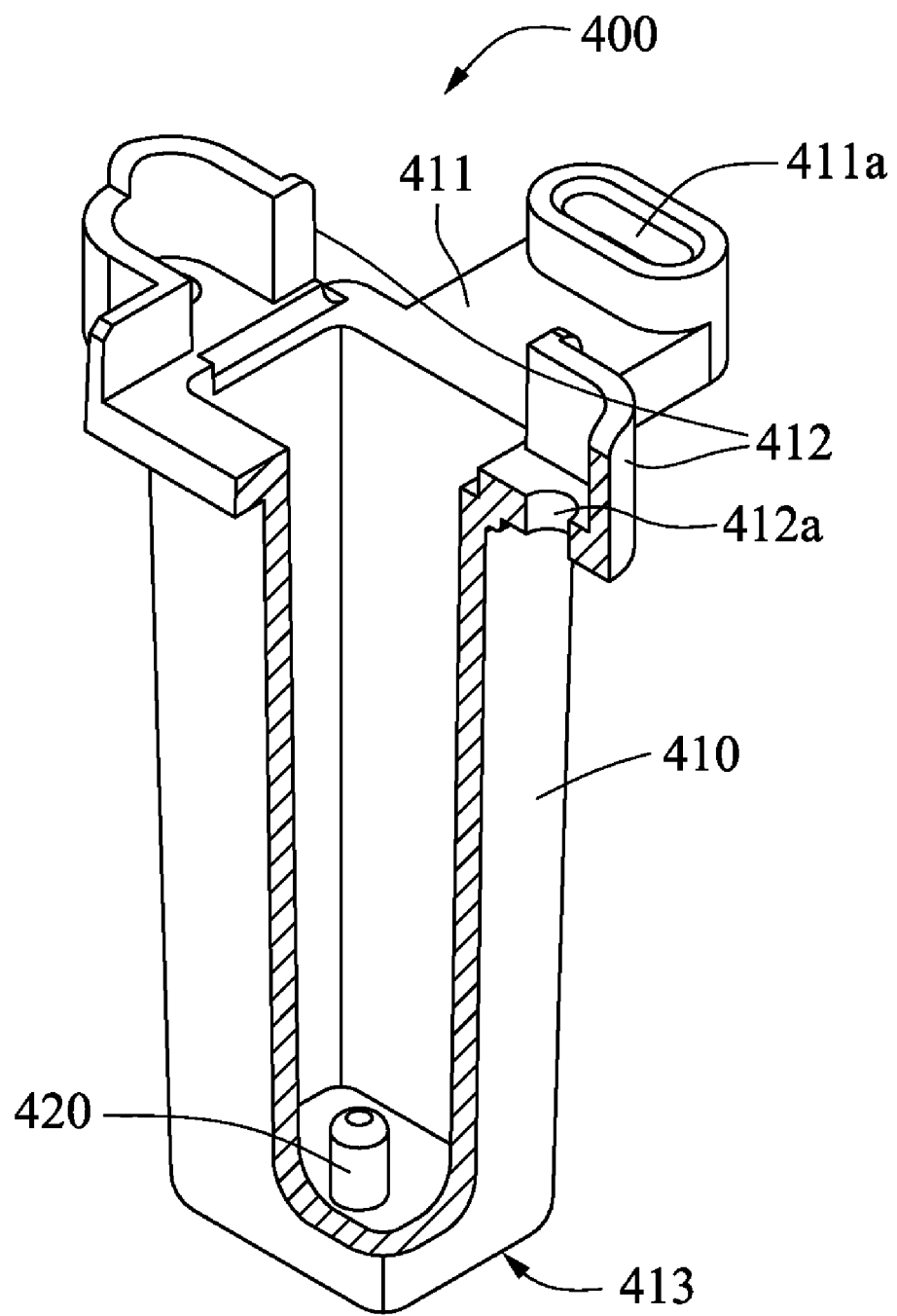
FIG. 4 is an isometric, enlarged, partial cross-section view of the sleeve of FIG. 1.

Referring to FIG. 4, the sleeve 400 includes a main square tube 410, a first cover 411, and two second covers 412 extending from the main tube 410. The first cover 411 defines a portion-receiving hole 411a corresponding to the movable portion 231. Each of the second covers 412 extending perpendicularly from the main tube 410 defines a through hole 412a corresponding to one of the screw-receiving portions 130. When the sleeve 400 is disposed on the socket 100 to cover the lifting member 300, the portion-receiving hole 411a and the locating portion 120 align and surround the movable portion 231; the through holes 412a are aligned with the screw-receiving portion 130, and sleeve 400 can thereby be fixed to the socket 100 by two screws 600 passing respectively through the through holes 412a and into the respective screw-receiving portions 130. The main tube 410 includes a top 413 configured for having a second protruding member 420 thereon.

Figure 5:
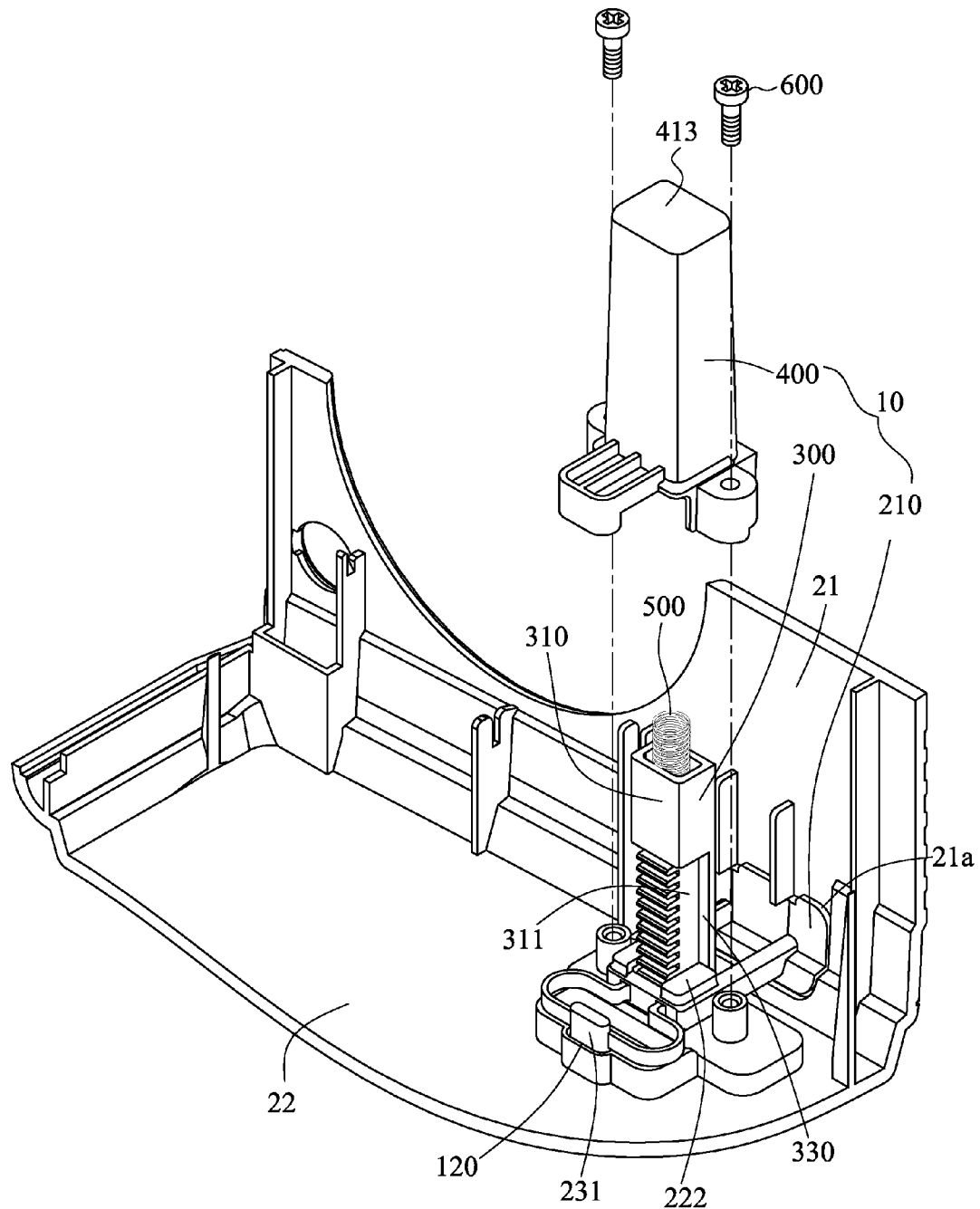
FIG. 5 is another isometric, exploded view of the height adjustment apparatus of FIG. 1.

Referring to FIG. 5, the elastic element 500 is a coil spring with two ends inserted by the first protruding member 330 and the second protruding member 420 respectively. The relaxed length of the elastic member 500 is longer than the sleeve. Therefore, when the sleeve 400 is fastened to the socket 100, the elastic element 500 is compressed by the first and second protruding members 330 and 420.

Figure 6:
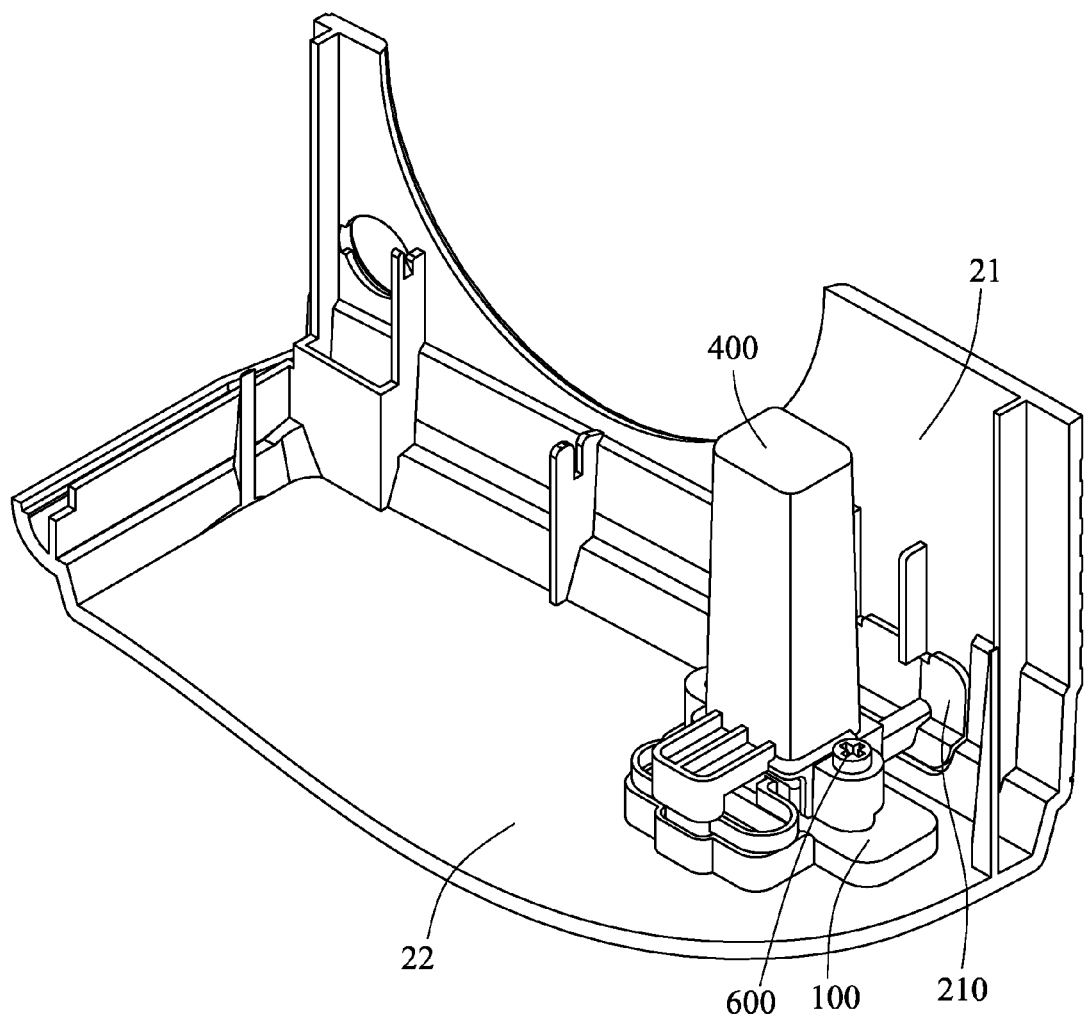
FIG. 6 is an isometric, assembled view of a height adjustment apparatus for a projection device according to a second embodiment.

As shown in FIGS. 5 and 6, when the height adjustment apparatus 10 is assembled, the lifting member 300 passes through the third opening 130 and the fourth opening 211, and thereby the engaging portion 220 is inserted by the upright lifting portion 311. Furthermore, the main portion 210 passes through the second opening 21a. The first blocking portion 221 is engaged with the toothed face 311 via the elastic force from the deformable portion 230 and the movable portion 231 is received by the locating portion 120 and the portion-receiving hole 411a (shown in FIG. 4).

When the engaging portion 200 is pressed to abut the locating portion 120, the deformable portion 230 deforms, and the first blocking portion 221 disengages the corresponding notch 311a. At that time, the elastic element 500 moves the lifting member 300 downwards. In other embodiments, if the elastic element 500 is omitted, the lifting member 300 can move downwards by gravity or user action. When force applied on the main portion 210 stops, the first blocking portion 221 is engaged with another notch 311a and the second blocking portions 222 are blocked by the space 330 uncovered by the upright lifting portion 311.

When the projection device housing 20 is to be adjusted, the user presses the main portion 210 so that the first blocking portion 221 disengages the notch 311a and the force from the elastic element 500 can lift the projection device housing 20.

It will be understood that the above particular embodiments are described and shown in the drawings by way of illustration only. The principles and features of the disclosure may be employed in various and numerous embodiments thereof without departing from the scope of the invention as claimed. The above-described embodiments illustrate the scope of the invention but do not restrict the scope of the invention.

What is claimed is:

1. A height adjustment apparatus for a projection device, the projection device comprising a housing comprising a front plate and a bottom plate substantially perpendicular to the front plate, the bottom plate defining a first opening therein, and the front plate defining a second opening therein, the height adjustment apparatus comprising:
   a socket located on an inner surface of the bottom plate and covering the first opening, the socket defining a third opening therein corresponding to the first opening and comprising a locating portion;
   an engaging member comprising a main portion, an engaging portion, a deformable portion, and a movable portion, the main portion defining a fourth opening therein and passing through the second opening so that the fourth opening aligns with the third opening, the engaging portion being formed on the periphery of the fourth opening, the movable portion being retained by the locating portion, the deformable portion being a flexible frame integrally formed with and connecting the main portion and the movable portion; and
   a lifting member comprising an upright lifting portion passing through the first, third and fourth openings and defining a toothed face capable of being engaged by the engaging portion, the deformable portion being capable of being deformed when the engaging member is pressed towards the locating portion and thereby disengaging from the toothed face, allowing the housing to be elevated or lowered.

2. The height adjustment apparatus of claim 1, wherein the toothed face comprises notches.

3. The height adjustment apparatus of claim 2, wherein the engaging portion comprises a first blocking portion adjacent to the deformable portion and the first blocking portion is capable of engaging with one of the notches.

4. The height adjustment apparatus of claim 3, wherein the engaging portion comprises a second blocking portion and the second blocking portion is capable of blocking a part which the upright lifting portion does not cover with the lifting member.

5. The height adjustment apparatus of claim 4, wherein the first blocking portion is positioned between the second blocking portions.

6. The height adjustment apparatus of claim 1, further comprising a sleeve sleeved on the lifting member and fixed to the socket, wherein the sleeve comprises a main tube, a first cover extending from the main tube, the first cover defines a portion-receiving hole corresponding to the movable portion.

7. The height adjustment apparatus of claim 6, wherein the socket further defines a screw-receiving portion; the sleeve further comprises a second cover extending from the main tube, the second cover defines a through hole corresponding to the screw-receiving portion; the sleeve is fixed to the socket via the through hole and the screw-receiving portion by a screw.

8. The height adjustment apparatus of claim 6, wherein the main tube has a top and a first protruding member disposed therein.

9. The height adjustment apparatus of claim 8, wherein the upright lifting portion has an opening and a second protruding member disposed therein.

10. The height adjustment apparatus of claim 9, wherein the first protruding member faces the second protruding member when the sleeve covers the upright lifting portion.

11. The height adjustment apparatus of claim 10, further comprising an elastic element having two ends inserted by the first protruding member and the second protruding member.

12. The height adjustment apparatus of claim 11, wherein the elastic element is compressed when the sleeve covers the upright lifting portion and the elastic element forces the lifting member to move away from the bottom plate.

13. The height adjustment apparatus of claim 11, wherein the elastic element is a coil spring.

14. The height adjustment apparatus of claim 1, wherein the main portion is received into the second opening.

15. The height adjustment apparatus of claim 1, wherein in cross-section, the upright lifting portion is substantially the same size as the third opening.

16. A projection device, comprising:
   a housing comprising a front plate and a bottom plate substantially perpendicular to the front plate, the bottom plate defining a first opening therein, and the front plate defining a second opening therein;
   a socket located on an inner surface of the bottom plate and covering the first opening, the socket defining a third opening therein corresponding to the first opening and comprising a locating portion;
   an engaging member comprising a main portion, an engaging portion, a deformable portion, and a movable portion, the main portion defining a fourth opening therein and passing through the second opening so that the fourth opening aligns with the third opening, the engaging portion being formed on the periphery of the fourth opening, the movable portion being retained by the locating portion, the deformable portion being a flexible frame integrally formed with and connecting the main portion and the movable portion;
   a lifting member comprising an upright lifting portion passing through the first, third and fourth openings and defining a toothed face capable of being engaged by the engaging portion, the deformable portion being capable of being deformed when the engaging member is pressed towards the locating portion and thereby disengaging from the toothed face, allowing the housing to be elevated or lowered; and
   a sleeve sleeved on the lifting member and fixed to the socket, the sleeve comprising a main tube, a first cover extending from the main tube, the first cover defines a portion-receiving hole corresponding to the movable portion.

17. The projection device of claim 16, wherein the socket further defines a screw-receiving portion; the sleeve further comprises a second cover extending from the main tube, the second cover defines a through hole corresponding to the screw-receiving portion; the sleeve is fixed to the socket via the through hole and the screw-receiving portion by a screw.

18. The projection device of claim 17, wherein the main tube has a top and a first protruding member disposed therein; the upright lifting portion has an opening and a second protruding member disposed therein.

19. The projection device of claim 18, further comprising an elastic element having two ends inserted by the first protruding member and the second protruding member when the sleeve covers the upright lifting portion.

* * * * *